(12) United States Patent
Caton et al.

(10) Patent No.: US 6,349,903 B2
(45) Date of Patent: *Feb. 26, 2002

(54) CONTROL SURFACE FOR AN AIRCRAFT

(75) Inventors: John Harold Caton, Edwardsville, IL (US); Michael James Hobey, St. Louis; John David Groeneveld, Maryland Heights, both of MO (US); Jack Howard Jacobs, Glendale, AZ (US); Robert Henry Wille, St. Charles, MO (US); Lawrence Otto. Brase, Jr., Edwardsville, IL (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/784,771

(22) Filed: Feb. 15, 2001

Related U.S. Application Data

(63) Continuation of application No. 09/517,838, filed on Mar. 2, 2000, now Pat. No. 6,209,824, which is a continuation of application No. 08/932,947, filed on Sep. 17, 1997, now abandoned.

(51) Int. Cl.$^7$ ................................................. B64C 9/00
(52) U.S. Cl. ...................................................... 244/213
(58) Field of Search ................................ 244/213, 214, 244/215, 219, 129, 1, 130, 131, 134 A, 45 A, 75 R, 199; 416/23, 24

(56) References Cited

U.S. PATENT DOCUMENTS

| | | | | |
|---|---|---|---|---|
| 1,942,867 A | * | 1/1934 | Leguillon | |
| 2,152,029 A | * | 3/1939 | Cone | |
| 2,173,262 A | * | 9/1939 | Monegan et al. | |
| 4,461,913 A | * | 7/1984 | Lewis et al. | 564/63 |
| 4,892,626 A | * | 1/1990 | Convey | 204/5 |
| 4,966,802 A | * | 10/1990 | Hertzberg | 428/119 |
| 5,094,412 A | * | 3/1992 | Narramore | 244/214 |
| 5,222,699 A | * | 6/1993 | Albach et al. | 244/213 |
| 5,288,039 A | * | 2/1994 | DeLaurler et al. | 244/219 |
| 5,326,050 A | * | 7/1994 | Zell | 244/75 R |
| 5,367,970 A | * | 11/1994 | Beauchamp et al. | 114/140 |
| 5,481,184 A | * | 1/1996 | Jacobsen | 324/106 |
| 6,209,824 B1 | * | 4/2001 | Caton et al. | 244/213 |

* cited by examiner

Primary Examiner—Charles T. Jordan
Assistant Examiner—Judith A. Nelson
(74) Attorney, Agent, or Firm—Harness Dickey & Pierce P.L.C.

(57) ABSTRACT

A control surface (152) for an aircraft has a reinforced elastomer surface (154) on a surface of the aircraft and has a perimeter (156) attached to the aircraft. An actuation mechanism (160) moves the reinforced elastomer surface (154) from a first position, substantially conforming to a moldline of the aircraft, to a second position, protruding from the moldline of the aircraft.

20 Claims, 8 Drawing Sheets

US 6,349,903 B2

CONTROL SURFACE FOR AN AIRCRAFT

CROSS REFERENCE TO RELATED APPLICATIONS

This application is a continuation of U.S. application Ser. No. 09/517,838, filed Mar. 2, 2000, now U.S. Pat. No. 6,209,824, which is in turn a continuation of U.S. application Ser. No. 08/932,947, filed Sep. 17, 1997, and presently abandoned.

FIELD OF THE INVENTION

The present invention relates generally to the field of aircraft and more particularly to a control surface for an aircraft.

BACKGROUND OF THE INVENTION

Aircraft incorporate control surfaces to provide roll, pitch and yaw control, as well as high lift devices such as flaps. Present control surfaces are rigid panels that are pivoted out of the surrounding moldline of the aircraft to create the control moment. These control surfaces have gaps that result in aerodynamic spillage, that reduce the effectiveness of the control surface. Present control surfaces are particularly ineffective in tailless aircraft designs. Tailless designs provide increased aerodynamic efficiency and agility. However, to provide adequate yaw control thrust-vectoring engine nozzles are required. Thrust-vectoring nozzles are expensive and heavy.

Thus there exists a need for a control surface that does not have aerodynamic spillage and can replace heavy, expensive thrust-vectoring nozzles on tailless aircraft designs.

SUMMARY OF THE INVENTION

A control surface for an aircraft that overcomes these and other problems has a reinforced elastomer surface on a surface of the aircraft and has a perimeter attached to the aircraft. An actuation mechanism moves the reinforced elastomer surface from a first position, substantially conforming to a moldline of the aircraft, to a second position, protruding from the moldline of the aircraft.

DETAILED DESCRIPTION OF THE DRAWINGS

Figure 1:
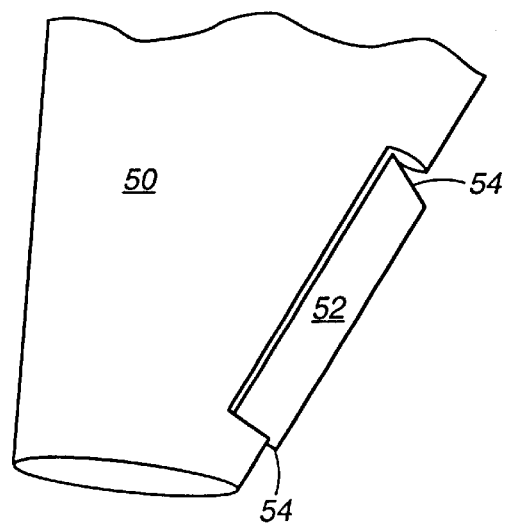
FIG. 1 is a perspective view of a wing of an aircraft with a prior art control surface.

FIG. 1 is a perspective view of a wing 50 of an aircraft with a prior art control surface 52. The prior art control surface 52 allows aerodynamic spillage through the gaps 54 between the wing and the control surface 52. This significantly limits the aerodynamic effectiveness of the control surface.

Figure 2:
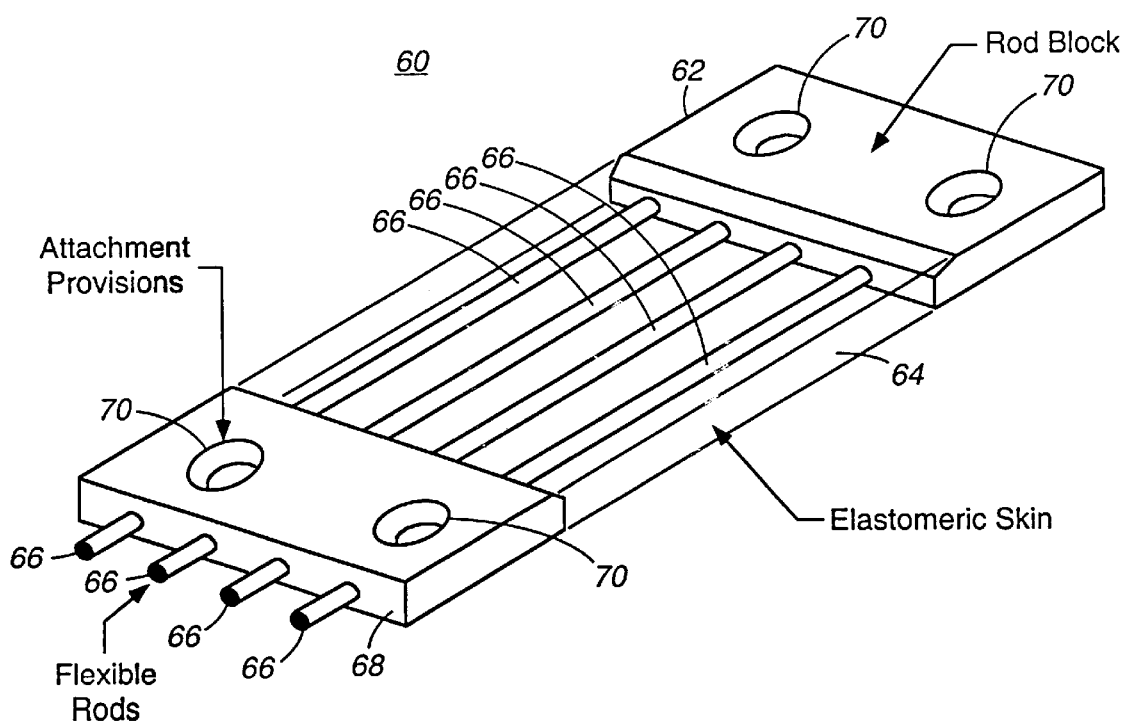
FIG. 2 is a perspective view of a reinforced elastomer panel.

The key to building an improved control surface for an aircraft is to design a control surface that takes advantage of the elastomer panel 60 as shown FIG. 2 in the design. The elastomer panel 60 has a rod block 62 attached along one edge to an elastomer skin 64. The elastomer skin 64 is capable of stretching to 100% of its unstressed length. In addition, the elastomer skin 64 is capable of twisting. A plurality of rods 66 are attached to the rod block 62 and are allowed to slide freely inside the elastomer skin 64. The rods 66 are made from quartz, epoxy or composites and flex without breaking. The stiffness of these reinforcements is designed to yield a specific expanded shape. The rods 66 provide the elastomer skin 64 with a curvilinear shape when the elastomer panel 60 is elongated, deflected or twisted. This curvilinear shape provides a good aerodynamic shape without any discontinuities that cause turbulence and drag.

A second rod block 68 is attached to an opposite edge of the elastomer skin 64. The second rod block 68 has a plurality of holes through which the plurality of rods 66 are allowed to slide freely. Both the rod block 62 and the second rod block 68 have attachment provisions 70, for attaching the elastomer panel 60 to the surface of an aircraft.

Figure 3:
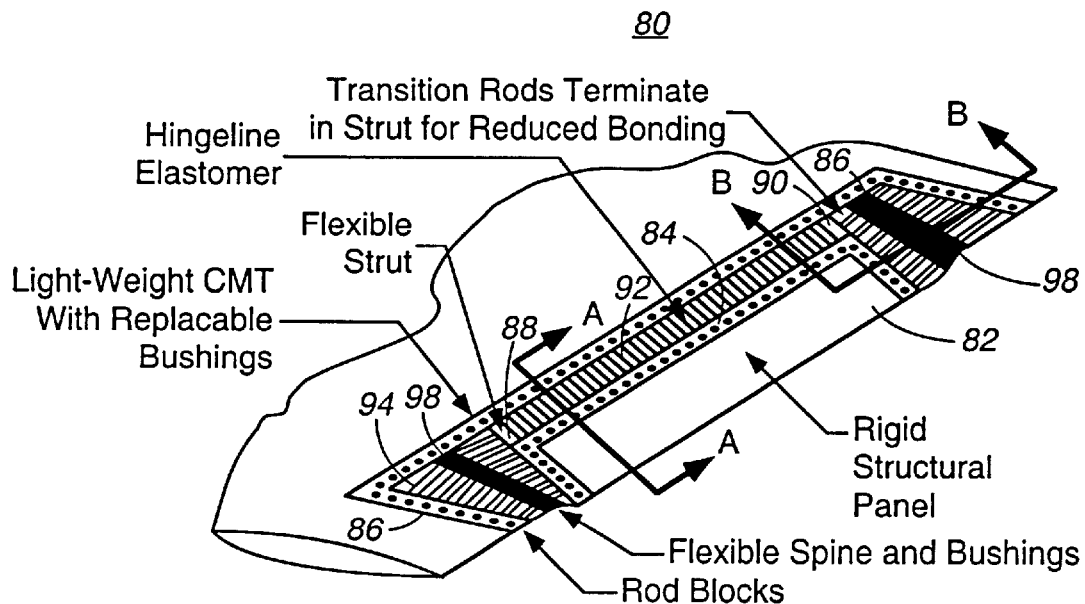
FIG. 3 is a perspective view of an embodiment of a control surface for an aircraft according to the invention.

FIG. 3 is a perspective view of an embodiment of a control surface 80 for an aircraft according to the invention. The control surface includes a rigid structural panel 82 pivotally attached to the aircraft. The rigid structural panel 82 has a long edge 84 and a pair of short edges 86. A pair of flexible struts 88, 90 extend from each of the pair of short edges 86 to the aircraft. The flexible struts 88, 90 in one embodiment are formed from a high durometer rubber. A long elastomer panel 92 is attached between the aircraft and the long edge 84 of the rigid structural panel 82. The long elastomer panel 92 is a reinforced elastomer panel as shown in FIG. 2. The reinforcing rods 66 are shown as the lines running perpendicular to the long edge 84. A pair of short elastomer panels 94, 96 are connected between the aircraft and the rigid structural panel 82. In addition, the short elastomer panels 94, 96 are connected to the struts 88, 90. The elastomer panels 94, 96 differ from the elastomer panel of FIG. 2, in that they contain a flexible spine 98. The flexible spine 98 will be described in greater detail in connection with FIGS. 8 and 9.

Figure 4:
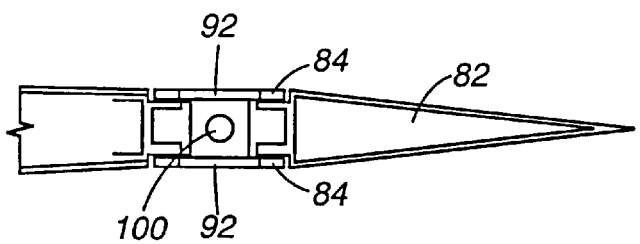
FIG. 4 is a cross sectional view of the control surface of FIG. 3 taken along the A—A line.
Figure 5:
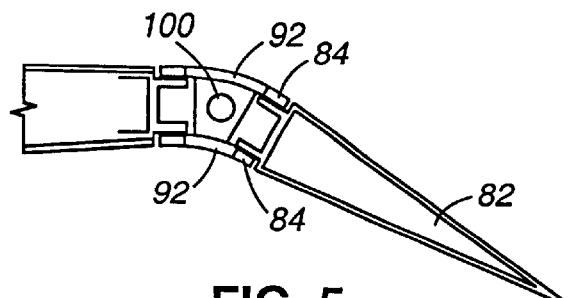
FIG. 5 is a cross sectional view of the control surface of FIG. 3 taken along the A—A line, in an actuated position.

FIGS. 4 & 5 are cross sectional views of the control surface of FIG. 3 taken along the A—A line. The long elastomer panel 92 consists of two elastomer panels one on the top and one on the bottom. The rigid structural panel 82 pivots along an axis 100 between the elastomer panels. One of the elastomer panels expands to cover the gap in FIG. 5 and the other elastomer panel contracts to cover the gap on the other side.

Figure 6:
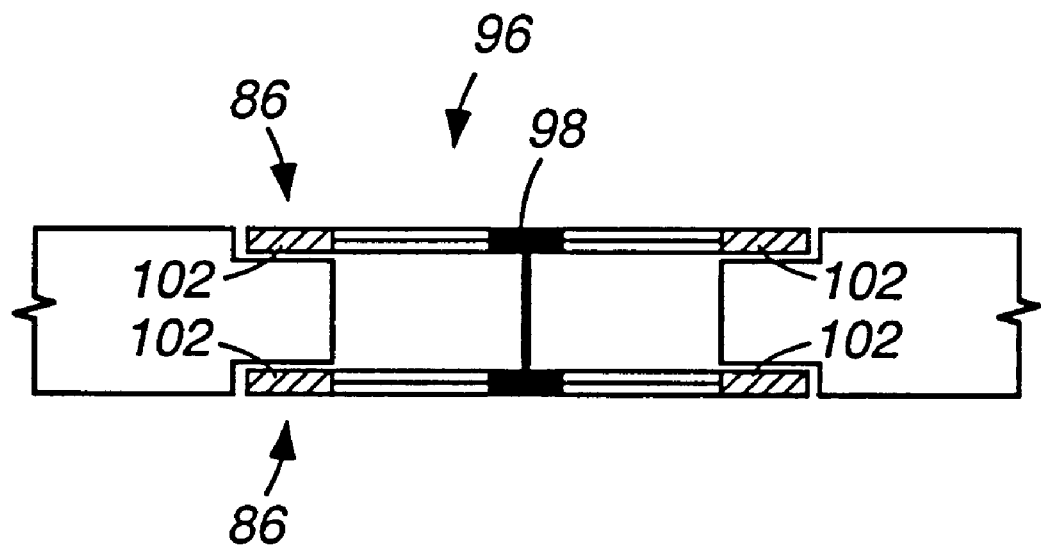
FIG. 6 is a cross sectional view of the control surface of FIG. 3 taken along the B—B line.
Figure 7:
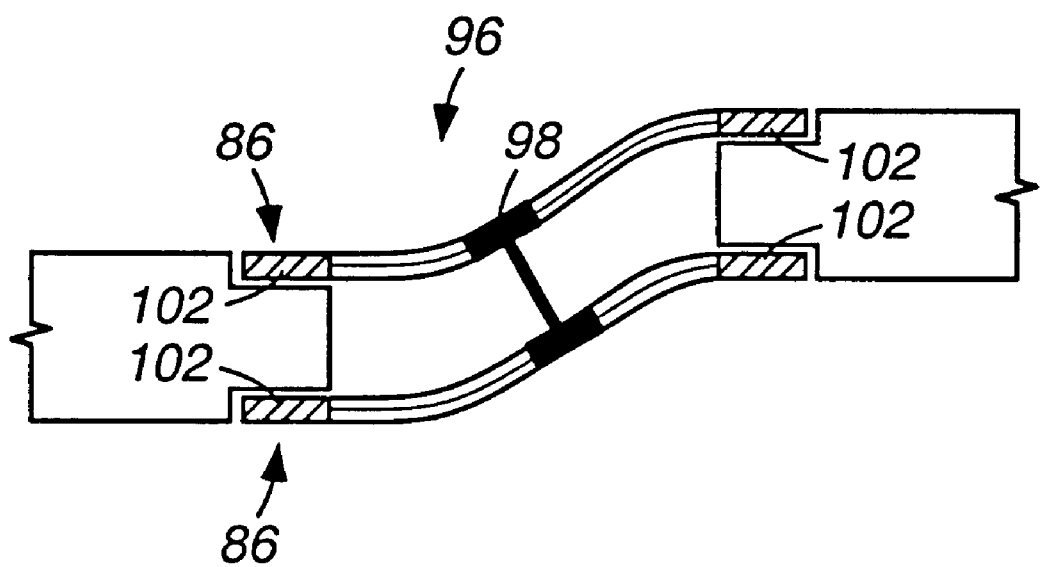
FIG. 7 is a cross sectional view of the control surface of FIG. 3 taken along the B—B line, in an actuated position.
Figure 8:
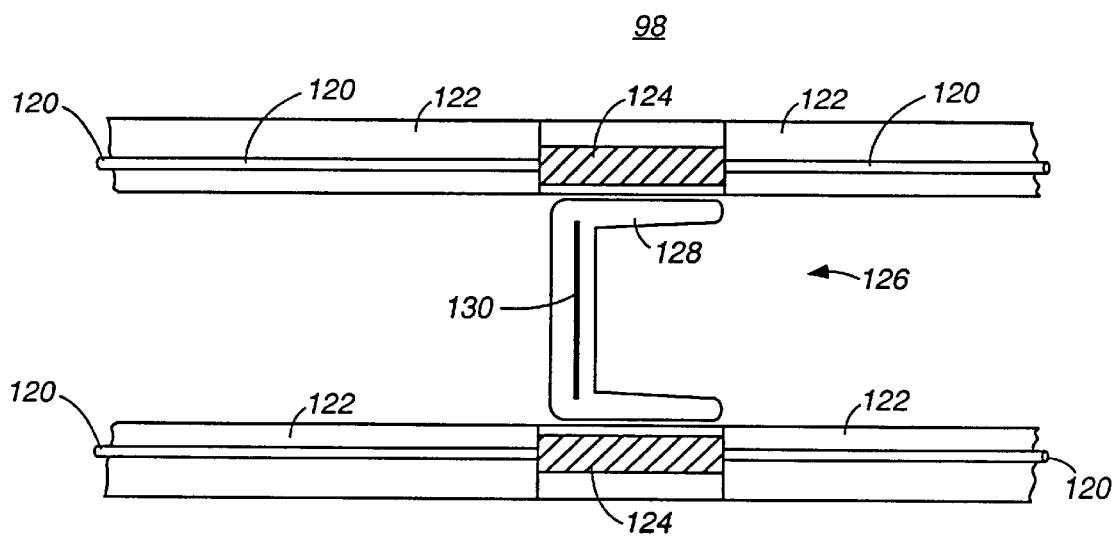
FIG. 8 is a cross section view of an embodiment of a flexible spine used in the control surface of FIG. 3.
Figure 9:
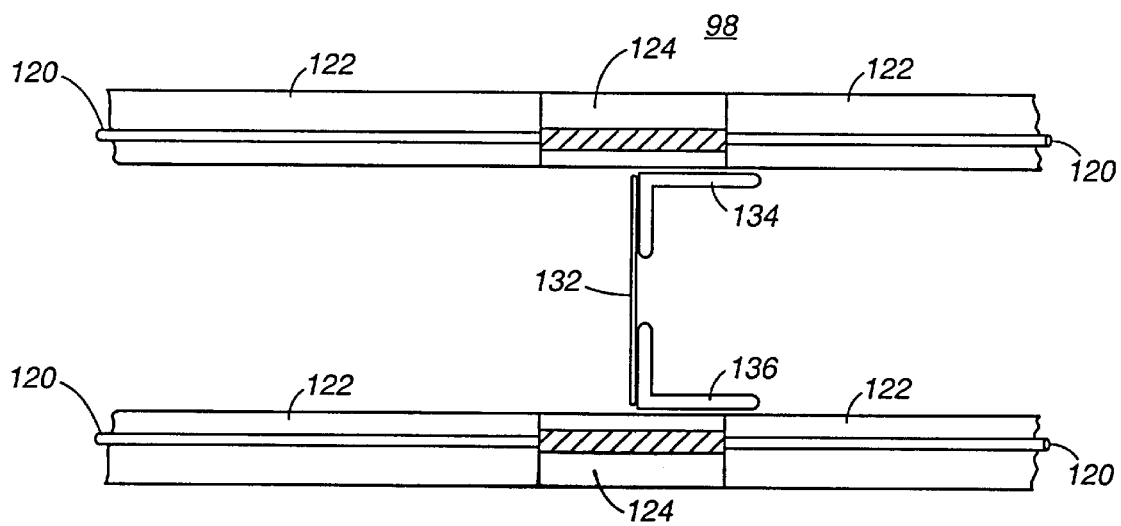
FIG. 9 is a cross section view of another embodiment of a flexible spine used in the control surface of FIG. 3.

FIGS. 6 and 7 are cross sectional views of the control surface of FIG. 3 taken along the B—B line. The elastomer panels 96 consist of a top and a bottom elastomer panel. A flexible spine 98 runs through the center of the elastomer panels. The reinforcing rods attach to the rod blocks 102 and then slide within a plurality of bushings in the spine 98. FIGS. 8 and 9 are two embodiments of the flexible spine 98. The reinforcing rods 120 are shown embedded in the elastomer sheet 122. The rods 120 terminate in a bushing 124. The bushing 124, in one embodiment, is made of a high durometer rubber. The rods 120 are allowed to slide freely within the cavity of the bushing 124. The spines 98 of FIGS. 8 and 9 differ in how the support brace 126 is designed. In FIG. 8 the support brace is a "C" shaped flexible member 128 with a reinforcing rod 130 embedded in the perpendicular side of the member 128. The parallel members are bonded to the bushing 124. In one embodiment, the "C" shaped flexible member 128 is made of a high durometer rubber.

The spine 98 in FIG. 9 has a composite plate 132 bonded to a pair of flexible footers 134, 136. The flexible footers 134, 136 are bonded to the bushings 124 and the elastomer sheets 122. In one embodiment the flexible footers 134, 136 are made of elastomer.

Figure 10:
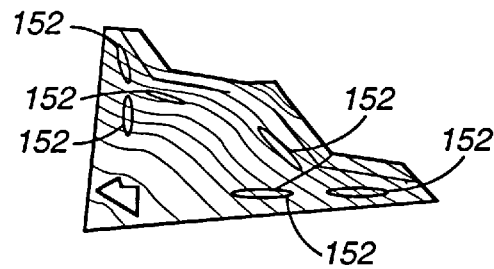
FIG. 10 is perspective view of a tailless aircraft having an embodiment of a control surface according to the invention.
Figure 11:
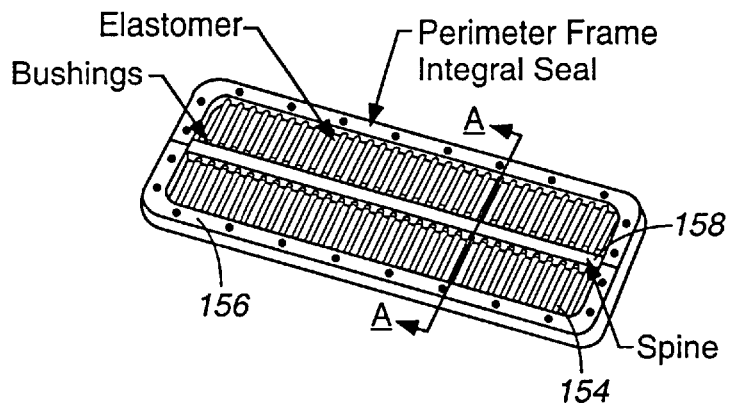
FIG. 11 is a perspective view of an embodiment of a control surface according to the invention.

FIG. 10 is perspective view of a tailless aircraft 150 having an embodiment of a control surface 152 according to the invention. The control surface 152 is mounted on the surface of the aircraft 150. FIG. 11 is a perspective view of an embodiment of the control surface 152. The control surface 152 has a reinforced elastomer surface 154. A perimeter 156 of the reinforced elastomer surface 154 is formed of rigid material and is attached to the aircraft. The reinforced elastomer surface 154 has a spine 158 extending along its center. The spine 158 in one embodiment is made of a high durometer rubber and has a plurality of cavities (bushings) into which the reinforcing rods slide.

Figure 12:
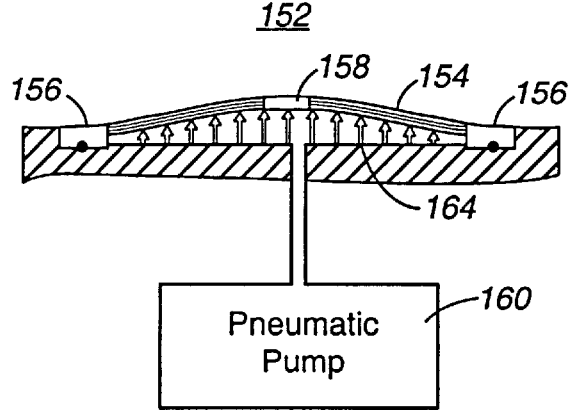
FIG. 12 is a cross sectional view of an embodiment of the control surface of FIG. 11.

FIG. 12 is a cross sectional view of an embodiment of the control surface of FIG. 11. In this embodiment, a pneumatic pump (actuation mechanism) 160 is connected to a bladder 164 between the elastomer surface 154 and aircraft. By inflating the bladder 164 the control surface is moved from a first position, conforming to the moldline of the aircraft, to a second position, where the control surface is outside the moldline of the aircraft.

Figure 13:
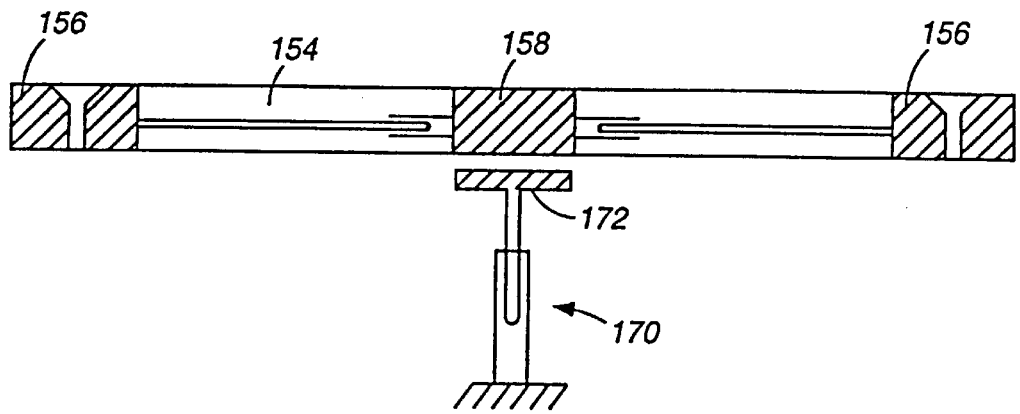
FIG. 13 is a cross sectional view of an embodiment of the control surface of FIG. 11.

FIG. 13 is a cross sectional view of another embodiment of the control surface 152 of FIG. 11. In this case the actuation mechanism 170 uses a plunger (rigid surface) 172 to move the control surface, by pushing on the spine 158. The actuation mechanism 170 can be mechanical, electromechanical or hydraulic. In another embodiment, shape memory alloy wires (slats) are embedded into the elastomer sheet 154. The shape memory alloy wires actuate the control surface by applying a current to change the state of the wires.

Figure 14:
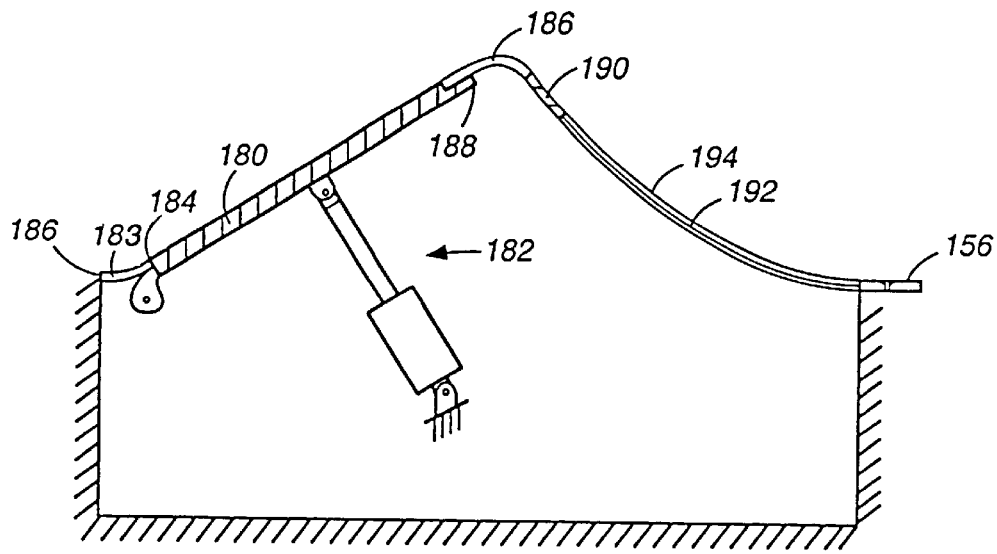
FIG. 14 is a cross sectional view of an embodiment of the control surface of FIG. 11.

FIG. 14 is a cross sectional view of another embodiment of the control surface 152 of FIG. 11. In this embodiment a rigid panel 180 is pivotally attached to the aircraft along the perimeter 156. An actuation mechanism 182 is attached to the rigid panel 180. In one embodiment the rigid panel 180 is formed out of a composite. An elastomer sheet 183 (not reinforced in one embodiment) connects a perimeter edge 184 of the rigid panel 180 to the aircraft. Another elastomer sheet 186 (not reinforced) is connected to the traveling edge 188 of the rigid panel 180.

A collar 190 is attached to the elastomer sheet 186. The collar 190 in one embodiment is made of a high durometer rubber. The reinforcing rods 192 of the reinforced elastomer panel 194 connect to the collar 190. The other ends of the rods 192 of the reinforced elastomer panel 194 slide in a rod block along the perimeter 156.

Figure 15:
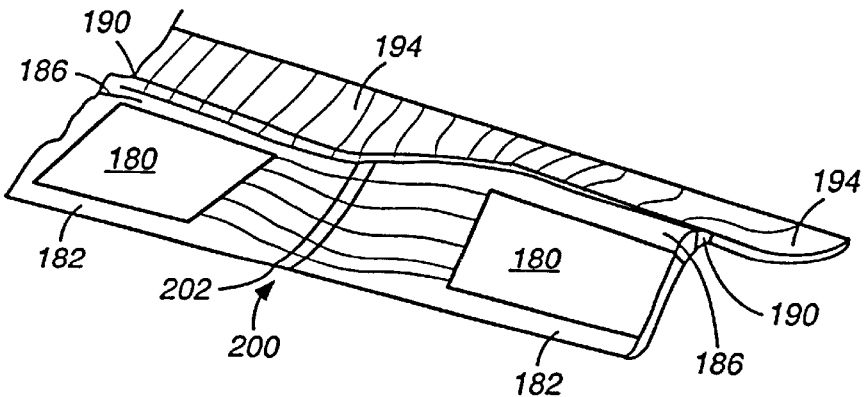
FIG. 15 is a perspective view of the control surface of FIG. 14.

FIG. 15 is a perspective view of an embodiment of the control surface of FIG. 14. In this embodiment two rigid panels 180 are adjacent to each other. An elastomer panel 200 connects the two elastomer panels 180. The elastomer panel 200 has a spine 202 running through the center of the elastomer panel 200. The spine 202 is similar to the spine and the reinforcing rods of the elastomer panel 200 slide within bushings in the spine 202. The other end of the reinforcing rods are connected to the rigid panels 180. The design provides a control surface with a variable control area.

Figure 16:
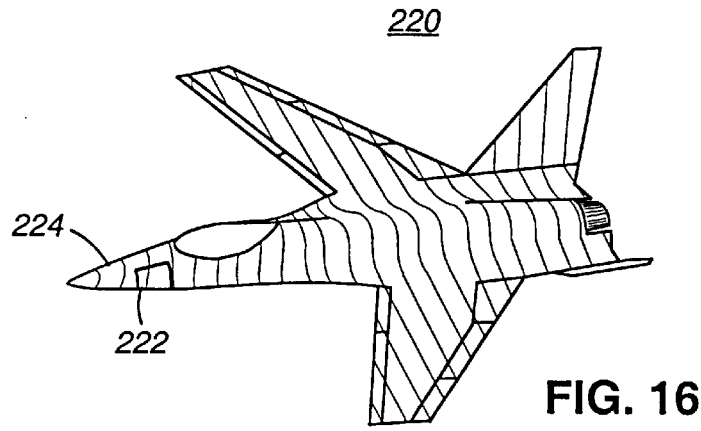
FIG. 16 is a perspective view of an aircraft having an embodiment of a control surface according to the invention.
Figure 17:
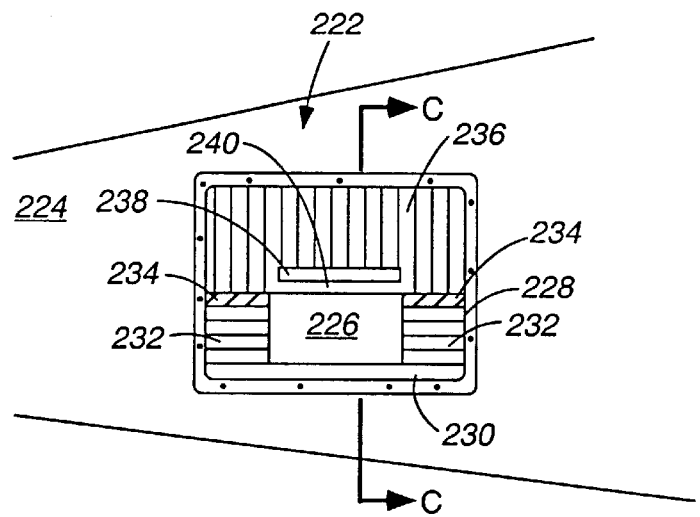
FIG. 17 is a top view of the control surface of FIG. 16.
Figure 18:
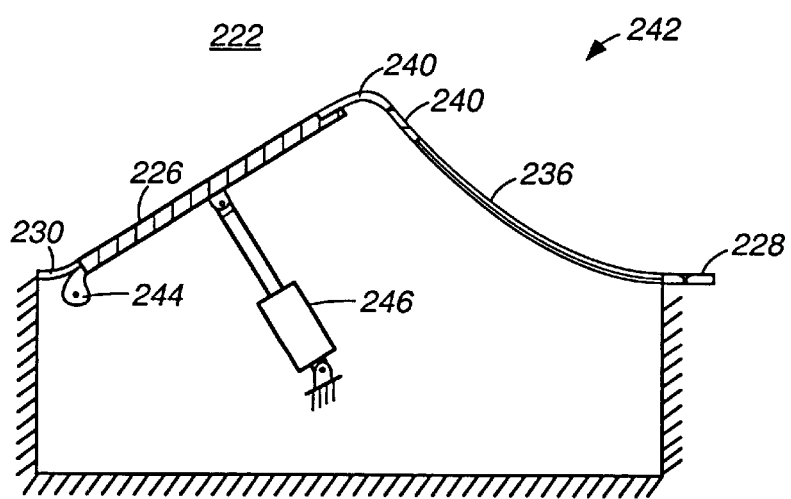
FIG. 18 is a cross sectional view of the control surface of FIG. 16; taken along the C—C line.

FIG. 16 is a perspective view of an aircraft 220 having an embodiment of a control surface 222 according to the invention. In this embodiment, the control surface is on a nose 224 of the aircraft 220. This control surface 222 provides yaw control for the aircraft 220 at high angles of attack, where conventional control surfaces are less effective. Generally, the control surface 222 would be placed on both sides of the aircraft. FIG. 17 is a top view of the control surface 222. A rigid panel 226 is surrounded by elastomer panels. A perimeter 228 of the control surface is attached to the aircraft 224. A portion of the elastomer sheet 230 without reinforcing rods is connected between the rigid panels 226 and the perimeter 228. A pair of side reinforced elastomer panels 232 connect the sides of the rigid panel 226 to the perimeter 228. A pair of struts 234 are connected between the top edge of the rigid panel 226 and the perimeter 228. A top reinforced elastomer panel 236 connects between the struts 234 and the perimeter 228. A floating strut 238 defines an elastomer panel 240 without reinforcing rods. The elastomer panel 240 allows the control surface to have a sharply sloping back surface 242 (see FIG. 18). FIG. 18 shows a cross section of the control surface taken along the C—C line. A pivot mechanism 244 attaches the rigid panel 226 to the aircraft. An actuation mechanism 246 is pivotally attached to the rigid panel 226 and moves the rigid panel from a first position (conformable surface) to a second position (protruding position). The control surface 222 is light weight and provides control without any gaps that reduce the effectiveness of conventional control surfaces. In addition, the control surface 222 is a novel control surface that has not been used on aircraft to date and provides yaw control at high angles of attack.

Figure 19:
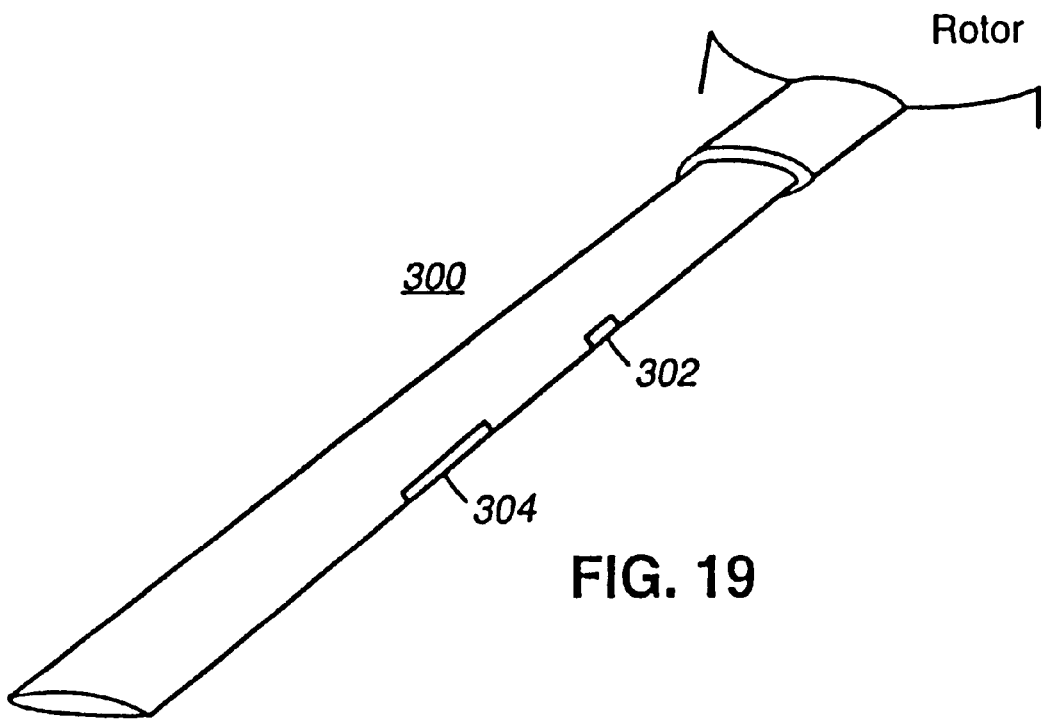
FIG. 19 is a perspective view of a rotor blade for a helicopter.
Figure 20:
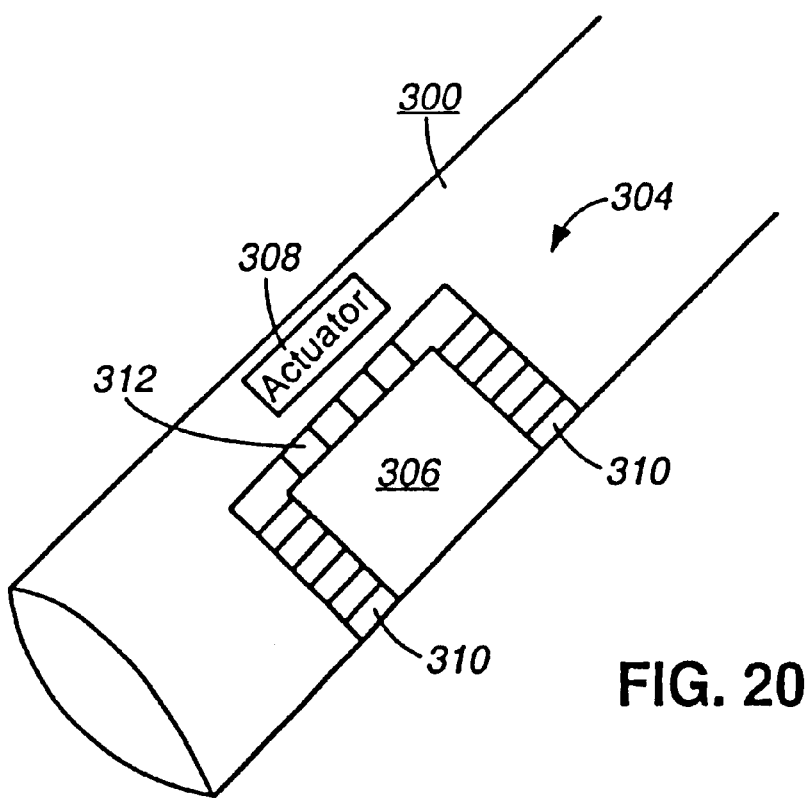
FIG. 20 is a perspective view of an embodiment of a control surface for a rotor.

FIG. 19 is a perspective view of a rotor blade 300 for a helicopter (aircraft). A static tab 302 is used to balance the blade 300 from rotational instability. An active flap 304 is used to provide active rotational stability. Active stability can improve rotor efficiency and increase the rotor blade's life. By using the reinforced elastomer panels in a tab design, gaps around the tabs can be eliminated. The gaps reduce efficiency and create vortices that the trailing blade hits. This reduces the lifetime of the rotor blades. FIG. 20 is a perspective view of an embodiment of a control surface 304 for a rotor blade 300. A rigid panel 306 is connected to an actuator 308. In one embodiment the actuator 308 is a shape memory alloy (SMA) actuation system. A SMA actuation system can be made small enough to fit within the confines of the rotor blade 300. The rigid panel 306 has a pair of side reinforced elastomer panels 310 and a back reinforced elastomer panel 312 that encases the rigid panel 306. Another embodiment of the control surface 304 includes struts and spines similar to those shown in FIG. 3.

Thus there has been described a control surface that eliminates gaps, weighs less than vectored nozzles and provides control surfaces that do not exist in the art. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A control surface for altering a moldline of an aircraft without forming any gaps or discontinuities in the moldline, comprising:
   a reinforced elastomer surface forming a portion of a surface of the aircraft and having a perimeter attached to the aircraft, the reinforced elastomer surface having an elastomer skin containing a plurality of rods;
   a spine made of high durometer rubber running through the reinforced elastomer surface and containing a plurality of bushings into which the plurality of rods slide; and
   an actuation mechanism for moving the reinforced elastomer surface from a first position, substantially conforming to a moldline of the aircraft, to a second position, protruding from the moldline of the aircraft.

2. The control surface of claim 1, wherein the reinforced elastomer surface is attached to a nose of an aircraft.

3. The control surface of claim 1, wherein the reinforced elastomer surface is attached to a wing of an aircraft.

4. The control surface of claim 1, wherein the actuation mechanism includes a bladder adjacent to a lower surface of the reinforced elastomer surface and a pneumatic pump attached to the bladder.

5. The control surface of claim 1, wherein the actuation mechanism includes a rigid surface adjacent to a lower surface of the reinforced elastomer surface and a mechanical actuator attached to the rigid surface.

6. A control surface for altering a contour of a moldline of an aircraft without forming gaps or discontinuities in the moldline, the control surface comprising,
   an elastomer surface forming a portion of a surface of the aircraft and attached to the aircraft along a perimeter, the elastomer surface having an elastomer skin containing a plurality of rods;
   a spine made of high durometer rubber running through the reinforced elastomer surface and containing a plurality of bushings into which the plurality of rods slide; and
   an actuator attached to the aircraft and displacing the elastomer surface from a conforming position wherein the elastomer surface essentially blends in with the moldline of the aircraft, to a position protruding outwardly of the moldline of the aircraft.

7. The control surface of claim 6, wherein the actuator is a mechanical mechanism.

8. The control surface of claim 6, wherein the actuator is a hydraulic mechanism.

9. The control surface of claim 6, wherein the actuator is a pneumatic pump.

10. The control surface of claim 6, wherein the elastomer surface further includes a rigid panel.

11. A control surface for altering the contour of a skin of an aircraft without forming gaps or discontinuities in the skin, the control surface comprising:
    a rigid structural panel pivotally attached to the aircraft to effectively form a portion of a skin of the aircraft, the rigid structural panel having a long edge and a pair of short edges;
    a pair of flexible struts, one of the pair of flexible struts extending between each of the pair of short edges and the skin of the aircraft;
    a long elastomer panel attached to the aircraft and the long edge of the rigid structural panel;
    a pair of short elastomer panels, each of the pair of short elastomer panels attached to the aircraft, one of the pair of struts and one of the pair of short edges, the pair of short elastomer panels are reinforced by a plurality of rods and wherein each of the pair of short elastomer panels include a flexible spine having a plurality of bushings, with the rods extending through the bushings, and
    wherein the rigid structural panel may be pivoted between a first position, wherein the rigid structural panel generally blends in with portions of the skin adjacent the rigid structural panel, to a second position wherein the rigid structural panel is displaced from the skin adjacent it without forming gaps or discontinuities in the skin.

12. The control surface of claim 11, wherein each of the plurality of rods slide within one of the plurality of bushings.

13. A control surface for an aircraft, comprising;
    at least one elastomer panel secured about at least a portion of its perimeter to a surface of the aircraft to thereby effectively form a planar portion of the surface of the aircraft;
    the elastomer panel including a flexible spine for providing support thereto; and
    a member for causing the elastomer panel to be urged into position in which it forms a non-planar portion of the surface of the aircraft and without forming gaps or discontinuities in the surface of the aircraft.

14. The control surface of claim 13, wherein the flexible spine comprises a plurality of bushings; and
    wherein the elastomer panel further includes a plurality of elongated rods which extend through the bushings to provide further support to the elastomer panel.

15. A method for forming a control surface for an aircraft, the method comprising the steps of:
    using an elastomer panel to form a portion of an outer skin of the aircraft and securing the elastomer panel about at least a portion of its periphery to the aircraft;
    disposing a plurality of rods within the elastomer panel to provide support to the elastomer panel; and
    using a member to urge the elastomer panel from a first position, wherein the elastomer panel blends in with a contour of the outer skin of the aircraft, into a second position wherein the elastomer panel forms a protrusion in the outer skin, and without forming gaps or discontinuities in the outer skin of the aircraft.

16. The method of claim 15, further comprising the step of:
    using a spine-like reinforcing member within the elastomer sheet to provide additional structural support to the elastomer panel.

17. A method for forming a control surface for an aircraft, the method comprising the steps of:

using a rigid structural panel to form a control surface;

securing a portion of the perimeter of the rigid structural panel to a first elastomer panel;

securing at least a portion of the elastomer panel to the aircraft;

securing a portion of the perimeter of the rigid structural panel to a second elastomer panel having a spine-like reinforcing member therein for providing additional structural support to the second elastomer panel; and causing said rigid structural panel to move from a first position, wherein the rigid structural panel generally blends in with the contour of the disposing a plurality of rods within the elastomer panel to provide support to the elastomer panel; and using a member to urge the rigid structural panel from a first position, wherein the rigid structural panel blends in with a contour of an outer skin of the aircraft, into a second position wherein the rigid structural panel forms is displaced from adjacent portions of the outer skin of the aircraft, and without forming gaps or discontinuities in the outer skin of the aircraft.

18. The method of claim 17, further comprising the step of:

disposing a plurality of elongated rods in each of the first and second elastomer panels.

19. The control surface of claim 1, wherein said moldline of said aircraft comprises a rotor blade.

20. The control surface of claim 13, wherein said surface of said aircraft comprises a rotor.

* * * * *